United States Patent
Guerrero, Jr.

(10) Patent No.: US 10,668,371 B2
(45) Date of Patent: Jun. 2, 2020

(54) GAME CONTROLLERS

(71) Applicant: RAZER (ASIA-PACIFIC) PTE. LTD., Singapore (SG)

(72) Inventor: Gil Palma Guerrero, Jr., Singapore (SG)

(73) Assignee: RAZER (ASIA-PACIFIC) PTE. LTD., Singapore (SG)

( * ) Notice: Subject to any disclaimer, the term of this patent is extended or adjusted under 35 U.S.C. 154(b) by 0 days.

(21) Appl. No.: 16/470,084

(22) PCT Filed: Dec. 16, 2016

(86) PCT No.: PCT/SG2016/050608
§ 371 (c)(1),
(2) Date: Jun. 14, 2019

(87) PCT Pub. No.: WO2018/111187
PCT Pub. Date: Jun. 21, 2018

(65) Prior Publication Data
US 2020/0016484 A1 Jan. 16, 2020

(51) Int. Cl.
*A63F 13/24* (2014.01)

(52) U.S. Cl.
CPC .................. *A63F 13/24* (2014.09)

(58) Field of Classification Search
CPC .................. A63F 13/20; A63F 13/24
See application file for complete search history.

(56) References Cited

U.S. PATENT DOCUMENTS

| 5,984,785 A * | 11/1999 | Takeda ............... A63F 13/02 463/38 |
| 6,659,870 B2 | 12/2003 | Sobota |
| 7,063,321 B2 | 6/2006 | Hussaini et al. |
| 8,115,588 B2 | 2/2012 | Numata et al. |
| 8,496,528 B2 | 7/2013 | Muramatsu |

(Continued)

FOREIGN PATENT DOCUMENTS

| CN | 1706530 A | 12/2005 |
| CN | 101067764 A | 11/2007 |

(Continued)

OTHER PUBLICATIONS

Geoff Duncan (2010) "N-Control Avenger Tricks Out Xbox 360 Controller", Digital Trends Retrieved from: http://www.digitaltrends.com/gaming/n-control-avenger-tricks-out-xbox-360-controller/ in 2 pages, printed Jul. 15, 2019.

(Continued)

*Primary Examiner* — Jasson H Yoo
(74) *Attorney, Agent, or Firm* — Polsinelli PC (57) ABSTRACT

According to various embodiments, there is provided a game controller including: a trigger button rotatable between a first position and a second position by rotating about a rotation axis, the trigger button being depressible in a direction to activate a switch when the trigger button is in the first position, wherein the direction is at least substantially perpendicular to the rotation axis; and a locking mechanism configured to constrain rotation of the trigger button when the trigger button is in the first position, and further configured to constrain rotation of the trigger button when the trigger button is in the second position.

17 Claims, 6 Drawing Sheets

(56) References Cited

U.S. PATENT DOCUMENTS

| | | | |
|---|---|---|---|
| 9,289,688 | B2 | 3/2016 | Burgess et al. |
| 9,352,229 | B2 | 5/2016 | Burgess et al. |
| 9,409,088 | B2 | 8/2016 | Antonio |
| D765,787 | S | 9/2016 | Kujawski et al. |
| D766,375 | S | 9/2016 | Kujawski et al. |
| 9,713,768 | B2 | 7/2017 | Uy et al. |
| 2005/0200596 | A1 | 9/2005 | Pihlaja |
| 2005/0275624 | A1 | 12/2005 | Chadha |
| 2012/0322555 | A1* | 12/2012 | Burgess ............... A63F 13/06 463/37 |
| 2013/0194085 | A1* | 8/2013 | Grant ................. G06F 3/016 340/407.2 |
| 2015/0238855 | A1 | 8/2015 | Uy et al. |
| 2016/0008711 | A1 | 1/2016 | Hackney |
| 2016/0082349 | A1 | 3/2016 | Burgess et al. |
| 2016/0193529 | A1 | 7/2016 | Burgess et al. |
| 2016/0228765 | A1 | 8/2016 | Rubio |
| 2016/0325177 | A1* | 11/2016 | Antonio .............. A63F 13/24 |
| 2016/0351362 | A1 | 12/2016 | Tsai et al. |
| 2016/0361639 | A1 | 12/2016 | Schmitz et al. |
| 2017/0001109 | A1* | 1/2017 | Dornbusch ......... A63F 13/98 |

FOREIGN PATENT DOCUMENTS

| | | |
|---|---|---|
| CN | 105188864 A | 12/2015 |
| CN | 205627034 U | 10/2016 |
| FR | 3020762 A1 | 11/2015 |
| WO | WO 02/07843 A1 | 1/2002 |
| WO | WO 2015/118082 A2 | 8/2015 |

OTHER PUBLICATIONS

Sean Hollister, "So This Is What a $150 Xbox Controller Feels Like", Gizmodo, Retrieved from: http://gizmodo.com/so-this-is-what-a-150-xbox-controller-fees-like-1712318136, Jun. 18, 2015 in 9 pages.

International Search Report and Written Opinion, dated Sep. 12, 2017, for the corresponding International Application No. PCT/SG2016/050608 in 11 pages.

Extended European Search Report dated Sep. 9, 2019, 7 pages, for the corresponding European Patent Application No. 16924083.5.

Office Action (including English Translation) dated Mar. 23, 2020, for the corresponding Chinese Application No. 201680091659.X in 9 total pages.

\* cited by examiner

GAME CONTROLLERS

TECHNICAL FIELD

Various embodiments relate to game controllers.

BACKGROUND

Game controllers are input devices that can be used to provide control inputs to a gaming application. A game controller may be a peripheral device that can be coupled to a computing device or a video gaming console such as the Microsoft Xbox, the Sony PlayStation or the Nintendo Switch. The coupling can be provided by a wired connection or a wireless connection such as WiFi. A game controller may also be integrated into a handheld gaming console. Examples of popular game controllers include the Razer WildCat and the Xbox Elite. Game controllers may include two trigger buttons at a rear surface of the game controller. The trigger buttons may be useful for providing rapid, repetitive inputs such as rapid firing or combat moves. The trigger buttons may also be used in combination with other controls or be customized to carry out special functions in the game. Gamers may sometimes prefer to remove the trigger buttons from the game controller to prevent accidental activation of the trigger buttons or to prevent damage to the trigger buttons during storage. As the trigger buttons may extend out of the game controller on the rear surface, the trigger buttons may be subjected to pressure when the game controller rests on its rear surface. The Razer WildCat controller and the Xbox Elite controller have removable trigger buttons. However, having the trigger buttons as removable elements may pose the risk of misplacing the trigger buttons. Also, in some game controllers, the removal of the trigger button requires the use of tools, which may be inconvenient for the user. As such, there may be a need to have a new type of game controller where accidental activation of the trigger buttons or damage to the trigger buttons can be prevented without removing the trigger buttons from the game controller.

SUMMARY

According to various embodiments, there may be provided a game controller including: a trigger button rotatable between a first position and a second position by rotating about a rotation axis, the trigger button being depressible in a direction to activate a switch when the trigger button is in the first position, wherein the direction is at least substantially perpendicular to the rotation axis; and a locking mechanism configured to constrain rotation of the trigger button when the trigger button is in the first position, and further configured to constrain rotation of the trigger button when the trigger button is in the second position.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments are described with reference to the following drawings, in which.

DESCRIPTION

Embodiments described below in context of the game controllers are analogously valid for the respective methods, and vice versa. Furthermore, it will be understood that the embodiments described below may be combined, for example, a part of one embodiment may be combined with a part of another embodiment.

It will be understood that any property described herein for a specific game controller may also hold for any game controller described herein. It will be understood that any property described herein for a specific method may also hold for any method described herein. Furthermore, it will be understood that for any game controller or method described herein, not necessarily all the components or steps described must be enclosed in the device or method, but only some (but not all) components or steps may be enclosed.

In the specification, the term "comprising" shall be understood to have a broad meaning similar to the term "including" and will be understood to imply the inclusion of a stated integer or step or group of integers or steps but not the exclusion of any other integer or step or group of integers or steps. This definition also applies to variations on the term "comprising" such as "comprise" and "comprises".

The term "coupled" (or "connected") herein may be understood as electrically coupled or as mechanically coupled, for example attached or fixed, or just in contact without any fixation, and it will be understood that both direct coupling or indirect coupling (in other words: coupling without direct contact) may be provided.

The reference to any prior art in this specification is not, and should not be taken as an acknowledgement or any form of suggestion that the referenced prior art forms part of the common general knowledge in Australia (or any other country).

In order that the invention may be readily understood and put into practical effect, particular embodiments will now be described by way of examples and not limitations, and with reference to the figures.

Game controllers are input devices that can be used to provide control inputs to a gaming application. A game controller may be a peripheral device that can be coupled to a computing device or a video gaming console such as the Microsoft Xbox, the Sony PlayStation or the Nintendo Switch. The coupling can be provided by a wired connection or a wireless connection such as WiFi. A game controller may also be integrated into a handheld gaming console. Examples of popular game controllers include the Razer WildCat and the Xbox Elite. Game controllers may include two trigger buttons at a rear surface of the game controller. The trigger buttons may be useful for providing rapid, repetitive inputs such as rapid firing or combat moves. The trigger buttons may also be used in combination with other controls or be customized to carry out special functions in the game. Gamers may sometimes prefer to remove the trigger buttons from the game controller to prevent accidental activation of the trigger buttons or to prevent damage to the trigger buttons during storage. As the trigger buttons may extend out of the game controller on the rear surface, the trigger buttons may be subjected to pressure when the game controller rests on its rear surface. The Razer WildCat controller and the Xbox Elite controller have removable trigger buttons. However, having the trigger buttons as removable elements may pose the risk of misplacing the trigger buttons. Also, in some game controllers, the removal of the trigger button requires the use of tools, which may be inconvenient for the user. As such, there may be a need to have a new type of game controller where accidental activation of the trigger buttons or damage to the trigger buttons can be prevented without removing the trigger buttons from the game controller.

According to various embodiments, a game controller may include a trigger button. The trigger button may be arranged on a rear side of the housing of the game controller. The trigger button may be adjusted between two positions—a first position where the trigger button is extended outwards from the housing of the game controller and is operable to activate a function; and a second position where the trigger button is stowed away or concealed. The trigger button may be depressed in a first direction that is towards the housing of the game controller. The trigger button may be stowed away, by rotating the trigger button towards the housing of the game controller in a second direction. The second direction may be at least substantially perpendicular to the first direction. The rear side of the housing may include a depression or a cavity. The trigger button may be placed in the depression or cavity when the trigger button is rotated towards the housing in the second direction. The depression or cavity may be deep enough to accommodate the trigger button entirely, such that the trigger button does not protrude out of the rear side of the housing. The game controller may include a locking mechanism that can lock the trigger button to each of the first position and the second position. The locking mechanism may include a protrusion on a bracket that is coupled to the housing, and an opening in the trigger button. The bracket may be pivotably coupled to the housing. The locking mechanism may lock the trigger button by having the protrusion fitted through the opening. The trigger button may be biased towards the bracket such that the protrusion cannot slip out of the opening unless a force is applied to disengage the protrusion from the opening. In addition to being part of the locking mechanism, the bracket may also be configured to pivot the trigger button in a direction that is going into the housing. When the trigger button is locked to the first position, the trigger button may be pivotable by virtue of being locked to the bracket.

According to various embodiments, the game controller may further include a release mechanism. The release mechanism, when operated, may remove the biasing force that pushes the trigger button to abut the internal component, such that the protrusion may disengage from the opening. The game controller may further include a spring element to push the trigger button away from the housing, so that the trigger button rotates from the second position to the first position when the release mechanism is operated.

Figure 1:
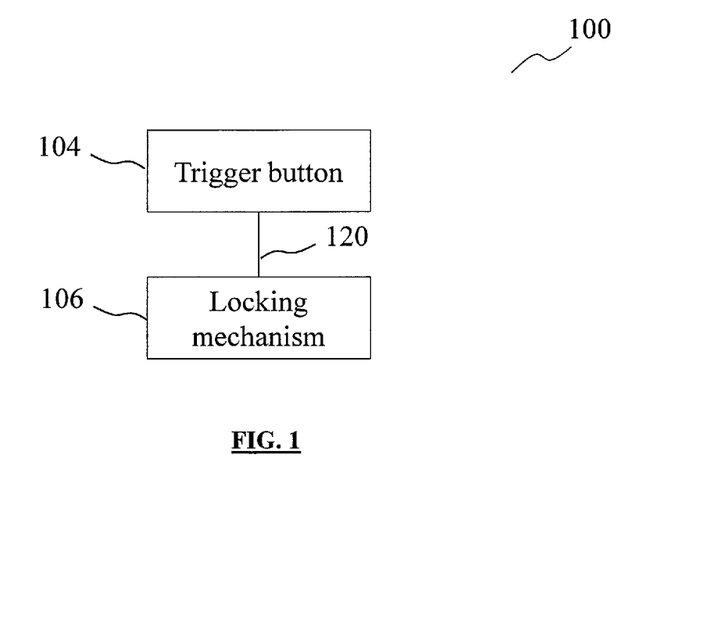
FIG. 1 shows a conceptual diagram of a game controller according to various embodiments.

FIG. 1 shows a conceptual diagram of a game controller 100 according to various embodiments. The game controller 100 may include a trigger button 104 and a locking mechanism 106. The trigger button 104 may be rotatable between a first position and a second position by rotating about a rotation axis. The trigger button 104 may be depressible in a direction to activate a switch when the trigger button 104 is in the first position. The direction may be at least substantially perpendicular to the rotation axis. The locking mechanism 106 may be configured to constrain rotation of the trigger button 104 when the trigger button 104 is in the first position, and further configured to constrain rotation of the trigger button 104 when the trigger button 104 is in the second position. The trigger button 104 and the locking mechanism 106 may be coupled with each other, like indicated by line 120, for example mechanically coupled.

In other words, according to various embodiments, a game controller 100 may include a trigger button 104 that may be rotated from a first position to a second position and vice versa. The first position may also be referred herein as an operable position. The second position may also be referred herein as the stowed away or the retracted position. The trigger button 104 may be rotated about a rotation axis. When the trigger button 104 is in the first position, the trigger button 104 may be depressed in a predetermined direction to activate a switch. The predetermined direction may be towards a housing of the game controller 100. The rotation axis may be at least substantially orthogonal to the predetermined direction. The trigger button 104 may be restrained from rotation when it is at the first position. The trigger button 104 may further be restrained from rotation when it is at the second position. The game controller 100 may further include a locking mechanism 106 which locks the trigger button 104 such that it is prevented from rotating when it is at the first position and when it is at the second position.

Figure 2:
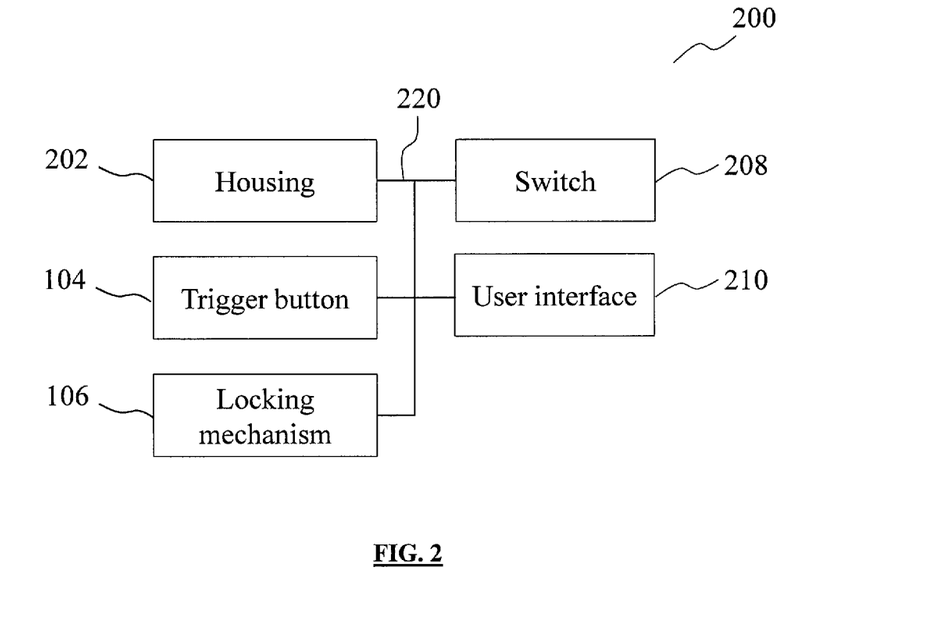
FIG. 2 shows a conceptual diagram of a game controller according to various embodiments.

FIG. 2 shows a conceptual diagram of a game controller 200 according to various embodiments. The game controller 200 may be similar to the game controller 100 in that it also includes the trigger button 104 and the locking mechanism 106. The game controller 200 may further include a housing 202. The housing 202 may enclose internal components of the game controller 200 such as switches, springs and electrical wiring. The housing 202 may protect the internal components from environmental elements such as dust and humidity. The housing 202 may also include non-slip surfaces to prevent the game controller 200 from slipping out of a user's hands. The game controller 200 may further include a switch 208. The switch 208 may be activated when the trigger button 104 is depressed towards the housing 202. The trigger button 104 may either directly contact the switch 208 or activate the switch 208 through an actuator positioned between the trigger button 104 and the switch 208. The switch 208 may be a hyper sensitive switch that can be activated with a small amount of force. The game controller 200 may further include a user interface 210 configured to receive user inputs for programming a function of the trigger button 104. The user interface 210 may be a digital interface or an analogue interface. The trigger button 104 may be a multi-function button, in other words, the function that the trigger button 104 may activate when the trigger button 104 is operated, may be variable. The determination of the function that the trigger button 104 can activate, may be performed via the user interface 210. The user interface 210 may also be provided on a computing device or a gaming console that the game controller 200 is coupled to. The trigger button 104, the locking mechanism 106, the housing 202, the switch 208 and the user interface 210 may be coupled with each other, like indicated by lines 220, for example mechanically coupled or electrically coupled, for example using a line or a cable.

Figure 3A:
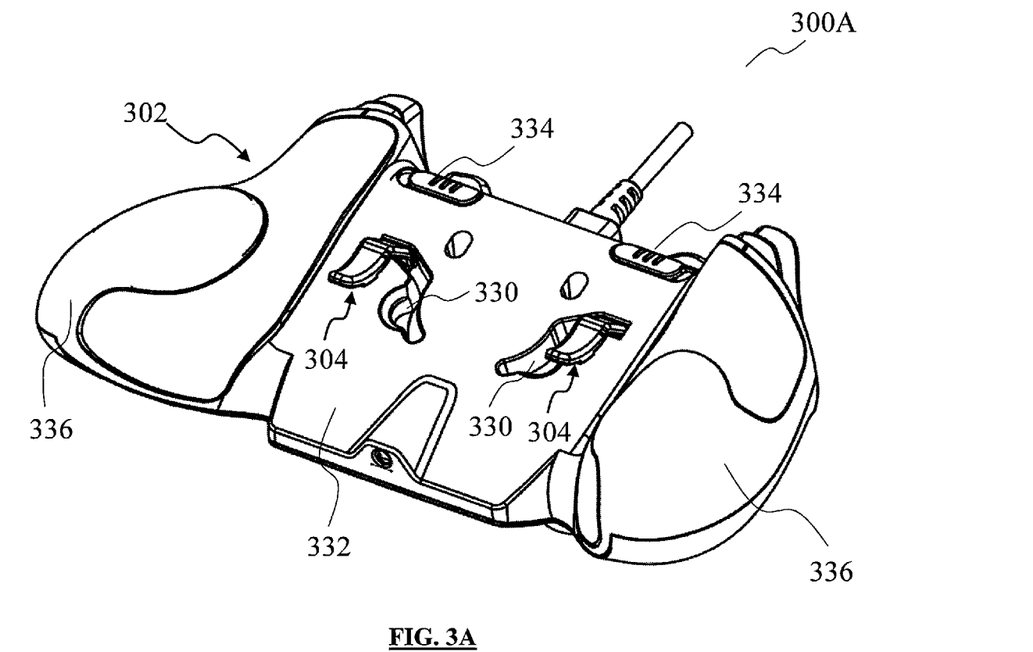
FIG. 3A shows a perspective view of a game controller according to various embodiments, when the trigger buttons are arranged in the operable position.

FIG. 3A shows a perspective view 300A of a game controller according to various embodiments, when the trigger buttons 304 are arranged in the operable position. The operable position may also be referred herein as the first position. The game controller shown in FIG. 3 may be the game controller 100 or the game controller 200, and the trigger button 304 may be identical to, or similar to the trigger button 104. The game controller may include a housing 302. The housing 302 may enclose the internal components of the game controller. The housing 302 may include curved surfaces 336 on two ends of the housing. A user of the game controller may grip the game controller at the curved surfaces 336. The curved surfaces may be covered at least partially with a non-slip material, such as rubber or silicone to provide better grip for the user's hands. The surface shown in the perspective view 300A may be an underside, also referred as a rear surface or a back surface 332 of the housing 302. The game controller may include a plurality of control buttons on a front surface of the housing 302. The front surface opposes the back surface 332. The front surface is hidden in the perspective view 300A. The game controller may include at least one trigger button 304. While the embodiment illustrated in FIG. 3A shows a pair of trigger buttons 304 positioned on the back surface 332, a game controller may include one or two or more trigger buttons 304. The trigger button 304 may also be arranged on the front surface of the housing 302 or on any other surface of the housing 302. The housing 302 may include a cavity or a depression 330 on the back surface 332. The trigger button 304 may be releasably coupled to a pivotable member (not shown) which may be arranged within the depression 330. The trigger button 304 may include a lever or an at least substantially flat and elongated handle, and may be coupled at one end to the housing 302. The trigger button 304 may be depressed towards the back surface 332, or in other words, pushed towards the back surface 332. When the trigger button 304 is depressed, the trigger button 304 may pivot about the one end. The game controller may also include a slide button 334 may be part of a release mechanism that may be operable to unlock the trigger button 304 from the pivotable member. When the trigger button is unlocked, the trigger button 304 may be rotatable to a second position. Alternatively, the slide button 334 may also be a control button used for providing user inputs. While the slide button 334 is shown as being arranged on the back surface 332, it would be understood that the slide button may be arranged elsewhere on the housing 302. Yet alternatively, bumpers instead of slide buttons may be arranged at the positions where FIG. 3A shows that the slide buttons 334 are positioned.

Figure 3B:
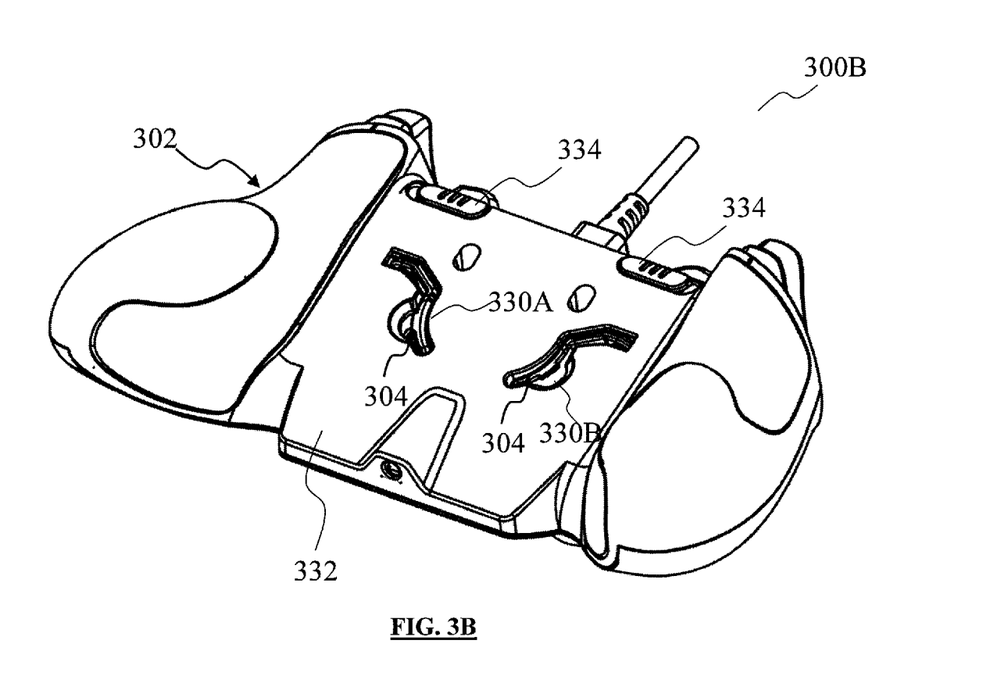
FIG. 3B shows a perspective view of the game controller of FIG. 3A, when the trigger buttons are arranged in the retracted position.

FIG. 3B shows a perspective view 300B of the game controller of FIG. 3A, when the trigger buttons 304 are arranged in the retracted position. The retracted position is also referred herein as the second position. The trigger buttons 304 are shown as being retracted into depressions 330. The trigger button 304 may be rotated from the operable position shown in FIG. 3A to the retracted position shown in FIG. 3B. The trigger button 304 may be rotated by at least substantially 90° to move from the operable position to the retracted position. The rotation of the trigger button 304 may be about a rotation axis that is at least substantially perpendicular to the direction that the trigger button 304 is depressible. The rotation axis may be at least substantially parallel to the back surface 332. The permissible rotation angle may be at most 90 degrees in either the clockwise direction or the counter-clockwise direction. The permissible rotation angle may be limited by the back surface 332 rather than by a rotation mechanism of the trigger button 304. For example, one end of the trigger button 304 may be coupled to the housing 302. The one end may be coupled to the housing 302 from within the depression 330. The depression 330 may be shaped to have a wall that limits the trigger button 304 from being rotated towards a particular direction, as the trigger button may abut the wall when it is being rotated towards the particular direction. The depression 330 may be shaped to accommodate the trigger button 304, when the trigger button 304 is rotated in a desired direction. In the example shown in FIG. 3B, the depression 330A is shaped to accommodate the trigger button 304 when the trigger button 304 is rotated towards the back surface 332 in a clockwise direction (from the perspective of a user viewing the back surface 332).

Figure 4:
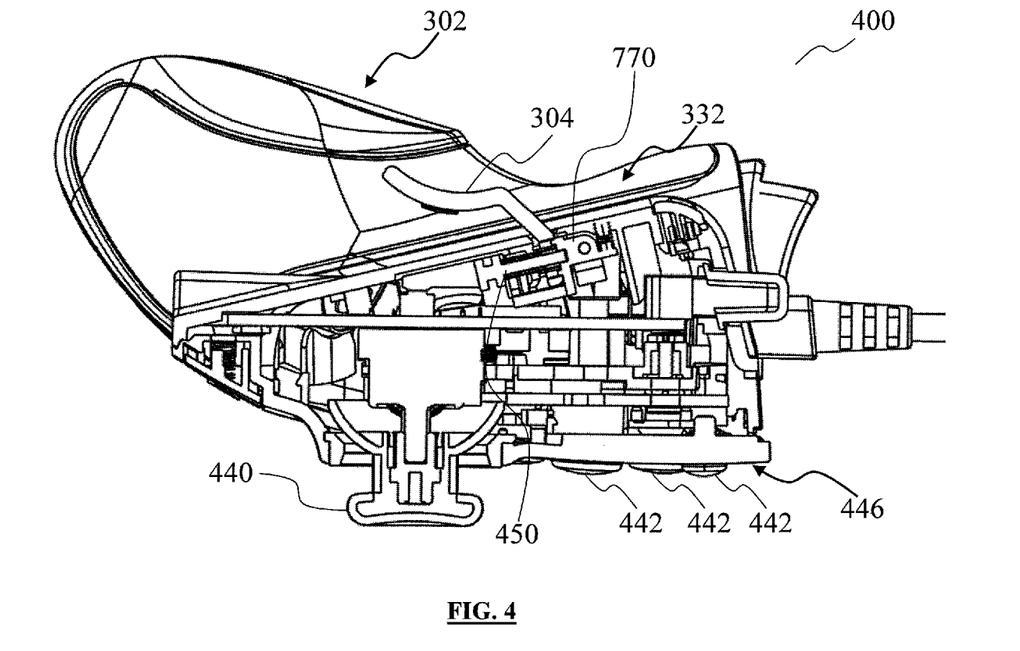
FIG. 4 shows a cross-sectional view of a game controller according to various embodiments.

FIG. 4 shows a cross-sectional view 400 of a game controller according to various embodiments. The game controller is shown in an inverted position such that the back surface 332 of the housing 302 is shown as being above the front surface 446 of the housing 302. In a normal usage of the game controller, the user will be facing the front surface 446. The game controller may be designed for the user to grip the game controller by its two ends, with the user's thumbs being placed on the front surface 446 while the user's fingers may be placed on the back surface 332. A plurality of control buttons may be provided on the front surface 446. The plurality of control buttons may include at least one of a thumb stick 440, a direction pad (D-pad), a bumper or a key pad. The thumb stick 440 may also be referred herein as a joystick. FIG. 4 also shows a plurality of buttons 442 which may be one of the direction pad, the bumper or the key pad. The buttons 442 may also be face buttons. The buttons 442 may be depressible in a direction that is towards the front surface 446. A trigger button 304 may be arranged at the back surface 332. The trigger button 304 may be coupled to a pivotable member 770. The trigger button 304 and the pivotable member 770 may be pivotable about a pivoting axis. A rotation axis pin 450 may be anchored or coupled to the pivotable member 770. The rotation axis pin 450 may be at least partially fitted through a receiving hole in the trigger button 304 and another receiving hole in the pivotable member 770. The trigger button 304 may rotate from the first position to the second position by rotating about the rotation axis defined by the rotation axis pin 450. The pivotable member 770 may engage the trigger button 304 such that the trigger button 304 pivots in tandem with the pivotable member 770. The rotation axis pin 450 may hold a compression spring. The rotation axis pin 450 may be an insert molded pin, fabricated out of a metallic material such as stainless steel. The rotation axis pin 450 may be fabricated as a single part from a molding machine. The rotation axis pin 450 may hold the trigger 304 to its stationary position in both the first position and the second position. The compression spring may be threaded through the rotation axis pin 450. The compression spring may push the trigger button 304 towards the pivotable member 770. When the trigger button 304 is rotated between the first position and the second position, the compression spring may be compressed temporarily, so as to allow the trigger button 304 to disengage temporarily from the pivotable member 770. When the compression spring rebounds following the temporary compression, the trigger button 304 may impact the pivotable member 770, thereby providing at least one of a tactile feel on the trigger button 304 or an audible sound. The tactile feel or the audible sound may be useful as a form of feedback for the user to know that the trigger button 304 is locked into position. The pivotable member 770 may also be coupled to a further compression spring which may bias the pivotable member 770 to a level position as shown in FIG. 4. When the trigger button 304 is depressed, the pivotable member 770 may pivot and thereby compress the further compression spring. When the external depressing force on the trigger button 304 is removed, the further compression spring may release the elastic energy stored therein to push the pivotable member 770 back to its default level position.

Figure 5:
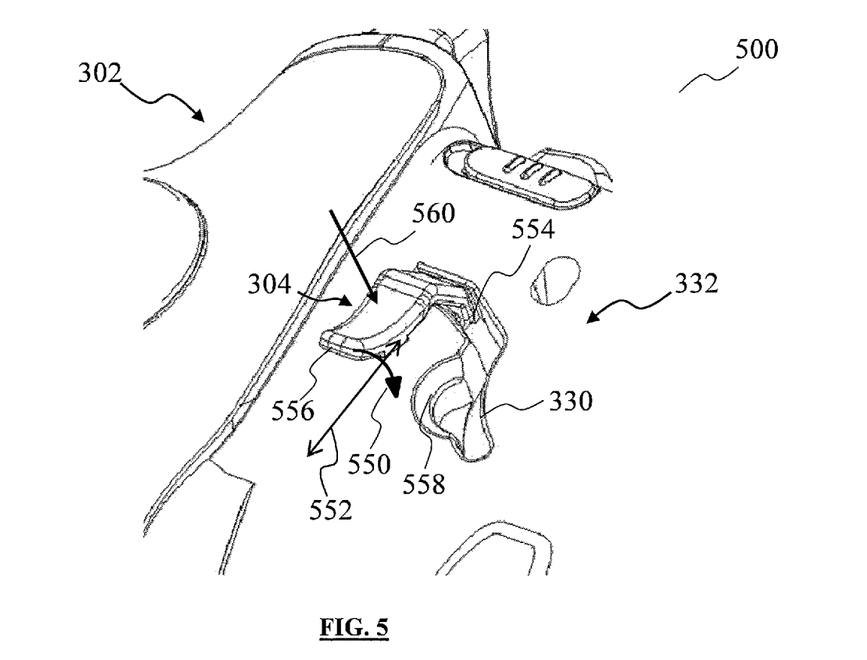
FIG. 5 shows a close-up view of a trigger button on a game controller according to various embodiments.

FIG. 5 shows a close-up view 500 of the trigger button 304 on a game controller according to various embodiments. The close-up view 500 shows the trigger button 304 in the first position. The trigger button 304 may be rotated in the direction indicated by the curved arrow 550, about the rotation axis 552, to arrive at the second position. At the second position, the trigger button 304 may be positioned inside the depression 330. The depression 330 may be large enough to store the trigger button 304. In addition, the depression 330 may include a concave space 558 for a user's finger to be inserted into the depression 330, so as to contact the trigger button 304. This may allow the user to manually pull the trigger button 304 out of the depression 330. The trigger button 304 may also be extended out from the depression 330, by actuating a release button. The release button may be coupled to a compression spring that biases the trigger button 304 towards the pivotable member 770. When the release button is actuated, the compression spring may be compressed so that the trigger button 304 is unlocked from the pivotable member 770. A further compression spring may push the trigger button 304 out of the depression 330. The rotation axis 552 may be at least substantially parallel to a plane defined by the back surface 332. The trigger button 304 may be depressed or pivoted by exerting a force on a second end 556 of the trigger button 304, in the direction 560. The direction 560 may be at least substantially perpendicular to the rotation axis 552. The second end 556 may oppose a first end 554. The trigger button 304 may be coupled to the pivotable member 770 at the first end 554.

Figure 6:
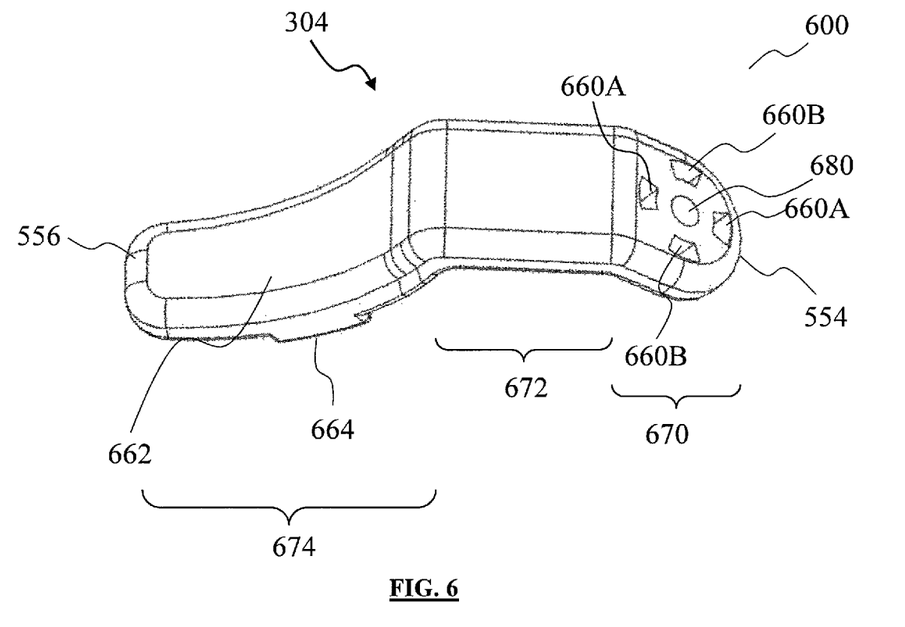
FIG. 6 shows a trigger button according to various embodiments.

FIG. 6 shows an illustration 600 of a trigger button 304 according to various embodiments. The trigger button 304 may include the first end 554 and the second end 556. The trigger button 304 may include a first segment 670, a second segment 672 and a third segment 674. The first segment 670 may include the first end 554. The first segment 670 may include an at least substantially planar surface. The first segment 670 may include at least two sets of openings or holes on the at least substantially planar surface. The first segment 670 may also include an at least substantially circular through hole 680 for receiving the rotation axis pin 450. The embodiment shown in FIG. 6 includes a first set of holes 660A and a second set of holes 660B. Each set of holes may include at least one hole. The second segment 672 may extend from the first segment 670. The second segment 672 may also include a surface that is at least substantially planar. The second segment 672 may be arranged at an angle with respect to the first segment 670. The angle may be an obtuse angle. The third segment 674 may extend from the second segment 672. The third segment 674 may include the second end 556. The third segment 674 may be shaped to receive a user's finger. For example, the third segment 674 may be curved, such as in a concave manner, or include a curved surface 662. The third segment 674 may include a contact platform 664. The contact platform 664 may activate the switch of the game controller when the trigger button 304 is depressed. The contact platform 664 may activate the switch by either directly contacting the switch or by contacting an actuator which then activates the switch. The contact platform 664 may protrude out of a bottom surface of the trigger button 304. The trigger button 304 may be fabricated by die casting aluminum.

Figure 7:
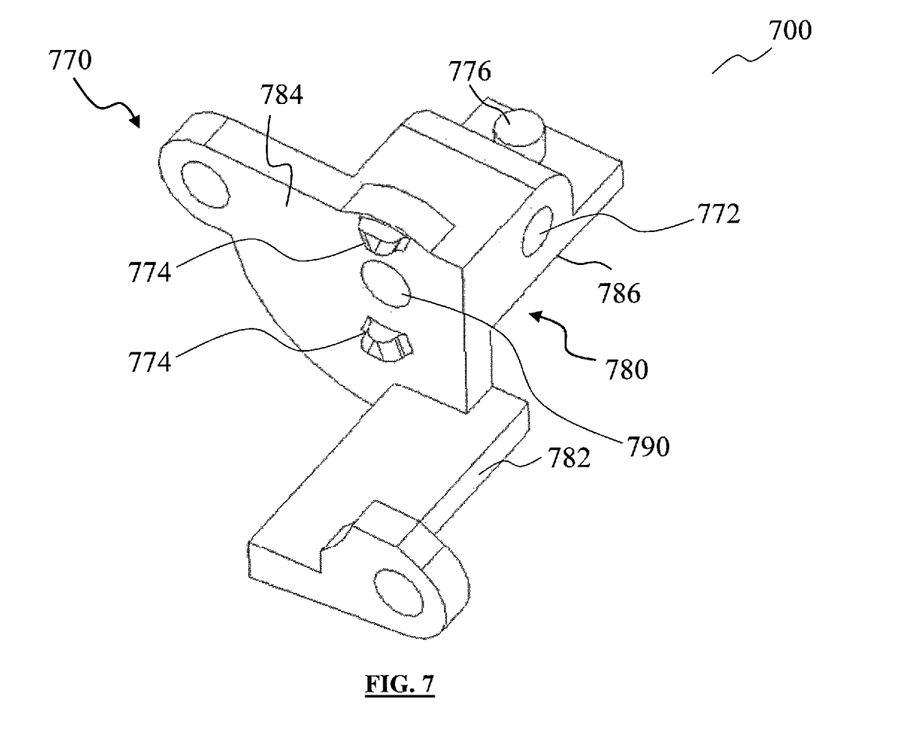
FIG. 7 shows a pivotable member according to various embodiments.

FIG. 7 shows an illustration 700 of a pivotable member 770 according to various embodiments. The pivotable member 770 may be part of the locking mechanism 106 and may be configured to engage the trigger button 304. The pivotable member 770 may include a first arm 780 and a second arm 782. The first arm 780 may be at least substantially perpendicular to the second arm 782. The first arm 780 may have a contact surface 784. At least one bump or protrusion 774 may be formed on the contact surface 784. When the game controller is in an assembled state, the contact surface 784 may abut the first segment 670 of the trigger button 304. The protrusions 774 may be shaped to fit in the holes 660A or 660B. The holes 660A or 660B may fit over the protrusions 774, so that the trigger button 304 cannot freely rotate between the first position and the second position. In other words, the locking mechanism 106 of the game controller may include the protrusion 774 and the holes 660A and 660B. When the trigger button 304 is at the first position, the first set of holes 660A may fit over protrusions 774 of the pivotable member 770. When the trigger button 304 is at the second position, the second set of holes 660B may fit over the protrusions 774 of the pivotable member 770. In the process of inserting the protrusion 774 into the hole 660A or 660B, at least one of the protrusion 774 or the hole may be transiently deformed until the protrusion 774 is fully inserted through the hole. When released from the transient deformation, the protrusion 774 or the hole may produce an audible sound, like a "click" sound. The sound may indicate to the user that the trigger button is locked in position. The release from the transient deformation may also provide a tactile feel to the user as the material of either the protrusion 774 or the hole rebounds to its original shape. A receiving hole 790 may be formed through the contact surface 784, to receive the rotation axis pin 450. The second arm 782 may serve to support an assembly of the rotation axis pin 450, as shown in FIG. 4. The first arm 780 may include an extension 786. The extension 786 may be at least substantially perpendicular to the contact surface 784. The extension 786 may include a through hole 772 for holding a pivot shaft. The pivotable member 770 may pivot about the pivot shaft. The extension 786 may include a holder 776 for holding a compression spring. The compression spring held by the holder 776 may bias the pivotable member 770 towards a level position for supporting the trigger button 304 in an undepressed position. The pivotable member 770 may be an aluminum die cast bracket. The pivotable member 770 may be configured to support or hold the rotation axis pin 450.

According to various embodiments, the pivotable member 770 may include holes while the trigger button 304 may include a protrusion. The protrusion may be shaped to fit in the holes.

Figure 8A:
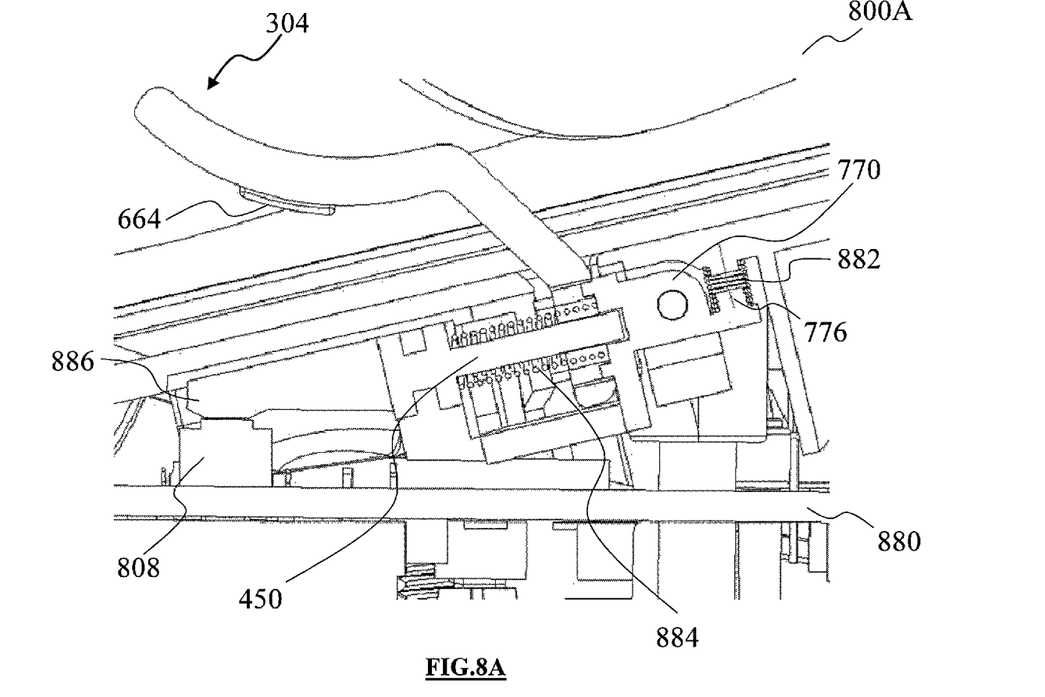
FIG. 8A shows a cross-sectional view of the operating mechanism of a trigger button according to various embodiments.

FIG. 8A shows a cross-sectional view 800A of the operating mechanism of a trigger button 304 according to various embodiments. The cross-sectional view 800A shows the trigger button 304 in the first position, i.e. the operable position. The main board 880, also referred herein as a circuit board, may be arranged under the trigger button 304, the pivotable member 770 and the rotation axis pin 450. A switch 808 may be coupled to the main board 880. When the electrical switch 808 is activated, an electrical signal may be transmitted to the main board 880. The electrical signal may be converted into a message for communication with a computing device or gaming console. The electrical switch 808 may be the switch 208. An actuator 886 may be arranged adjacent to the electrical switch 808. The actuator 886 may be fabricated from a polymer material such as ABS plastic. The rotation axis pin 450 may be insert molded to the actuator 886. The trigger button 304 may rotate about the rotation axis pin 450. By being threaded through the through hole 680 of the trigger button 304, the rotation axis pin 450 may hold the trigger button 304 in place in the game controller. The trigger button 304 may extend out of the housing of the game controller. In its default state, i.e. undepressed state when no external force is exerted on the trigger button 304, the contact platform 664 does not contact the actuator 886 and the switch 808. A first biasing member 882 which may be a compression spring, may bias the trigger button towards being undepressed. A second biasing member 884 may also be compression spring. The second biasing member 884 may bias the trigger button 304 to abut the pivotable member 770.

Figure 8B:
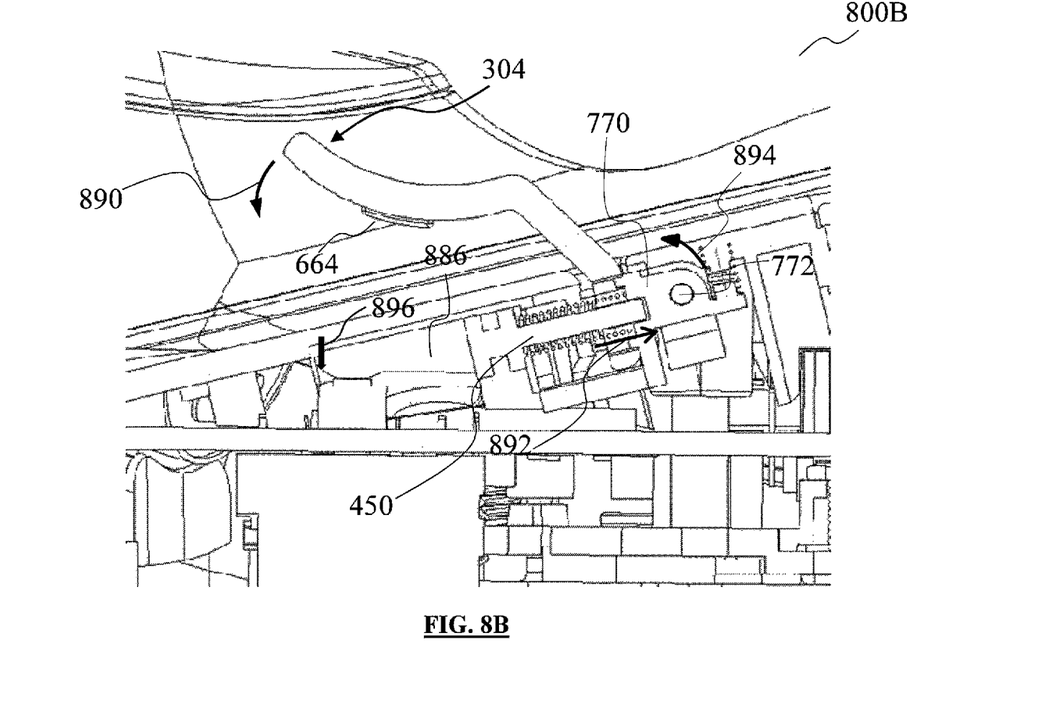
FIG. 8B shows the cross-sectional view of FIG. 8A annotated with arrows indicating movements within the operating mechanism when the trigger button is depressed.

FIG. 8B shows a cross-sectional view 800B which is the cross-sectional view 800A annotated with arrows indicating movements in the operating mechanism of the trigger button 304 when the trigger button 304 is depressed. The trigger button 304 may be depressible at least substantially towards the housing, i.e. in the direction 890. When the game controller is held upright, the direction 890 may be towards the user, i.e. upwards. When the trigger button 304 is depressed, the rotation axis pin 450 moves in the direction 892 towards the pivotable member 770. By virtue of being locked to the trigger button 304, the pivotable member 770 pivots about its pivot axis in the direction 894. The pivot axis of the pivotable member 770 may be defined by the pivot shaft inserted into the through hole 772. When the trigger button 304 pivots, the contact platform 664 may impact or activate the actuator 886. The actuator 886 may also move together with the rotation axis pin 450 towards the direction 892. The actuator 886 may thereby activate the electrical switch 808. The actuator 886 may move towards the switch 808 in a direction 896. The actuator 886 may serve as the main body that actuates the switch 808 when the trigger button 304 is depressed. The actuator 886 may be coupled to the pivotable member 770 and the trigger button 304 through the rotation axis pin 450. Throughout the pivoting of the trigger button 304, the trigger button 304 may remain stationary relative to the pivotable member 770. When the trigger button 304 is contacting the electrical switch 808, the first biasing member 882 may be compressed.

Figure 9:
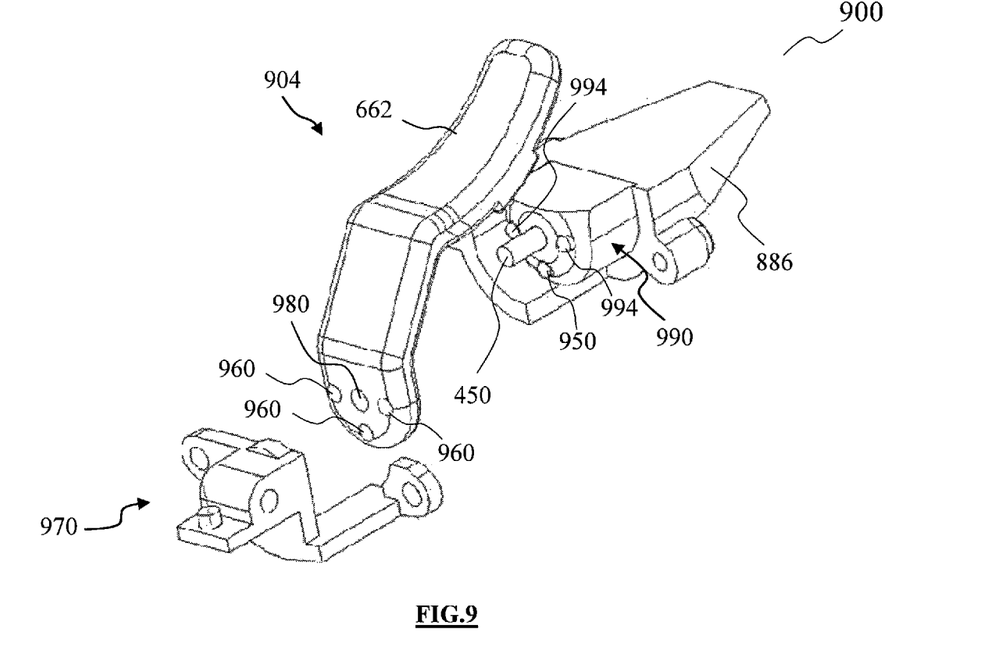
FIG. 9 shows an illustration of the operating mechanism of a trigger button according to various embodiments.

FIG. 9 shows an illustration 900 of the operating mechanism of a trigger button 904 according to various embodiments. The operating mechanism may be similar to the operating mechanism of FIG. 8A, but may further include a casing 990 coupled to the actuator 886. The trigger button 904 may be the trigger button 104 while the locking mechanism may be the locking mechanism 106. The trigger button 904 may be similar to the trigger button 304 in that it may also include a plurality of holes 960 for engaging with a corresponding plurality of protrusions 994. The plurality of holes 960 and the plurality of protrusions 994 may be part of the locking mechanism. The plurality of protrusions 994 may be provided on the casing 990. The plurality of protrusions may include at least one spring-loaded lock pin 950. In addition to providing the protrusions 994 for locking the trigger button 904, the casing 990 may also function as a holder to the trigger button 904. The trigger button 904 may be couplable to each of the bracket 970 and the casing 990. The trigger button 904 may be sandwiched in between the casing 990 and the bracket 970. The casing 990 may include the rotating axis pin 450. The protrusions 994 may be arranged at a peripheral boundary of the rotating axis pin 450. The casing 990 may be fabricated out of a self-lubricating material, such as polyocymethylene (POM). A bracket 970, similar to the pivotable member 770 except that it may not include any protrusion 774, may be provided. The bracket 970 may include a receiving hole 780 for receiving the rotating axis pin 450.

Figure 10:
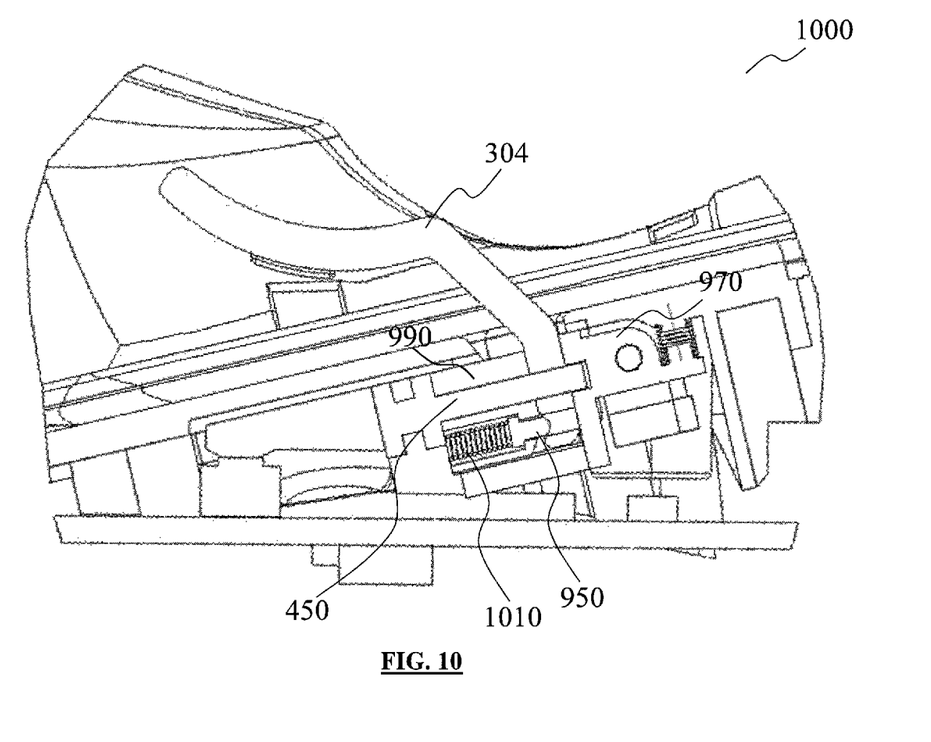
FIG. 10 shows a cross-sectional view of the operating mechanism of a trigger button according to various embodiments.

FIG. 10 shows a cross-sectional view 1000 of the operating mechanism of a trigger button 904 according to various embodiments. The operating mechanism may be similar to the operating mechanism of FIG. 8A, but may further include the casing 990 and the lock pin 950. A spring 1010 may be fitted onto the lock pin 950, to bias the lock pin 950 against the trigger button. The lock pin 950 may abut the first segment 670 of the trigger button 904. The first segment 670 may include a notch on the surface facing the lock pin 950 and the lock pin 950 may fit into the notch when the lock pin 950 abuts the trigger button 904. The notch may be one of the holes 960. The lock pin 950 may be one of the protrusions 994. When the trigger button 904 is being rotated, the protrusions 994 on the casing 990 may disengage from the holes 960 on the trigger button 904, and the trigger button 904 may displace slightly away from the casing 990. The spring 1010 may expand and push the lock pin 950 towards the notch, thereby producing a snap lock effect. A 'click' sound may also be generated in the snap lock effect. The snap lock effect may provide at least one of a tactile feedback or an audio feedback to the user, so that the user knows that the trigger button 904 is unlocked from the first position or the second position. When the trigger button 904 locks into the first position or the second position, the trigger button 904 may displace slightly towards the casing 990 and again, the lock pin 950 may be pushed into the notch, thereby producing the snap lock effect. The user may thereby be informed that the trigger button 904 has been locked into the first position or the second position.

The following examples pertain to further embodiments.

Example 1 is a game controller including a trigger button rotatable between a first position and a second position by rotating about a rotation axis, the trigger button being depressible in a direction to activate a switch when the trigger button is in the first position, wherein the direction is at least substantially perpendicular to the rotation axis; and a locking mechanism configured to constrain rotation of the trigger button when the trigger button is in the first position, and further configured to constrain rotation of the trigger button when the trigger button is in the second position.

In example 2, the subject-matter of example 1 can optionally include a housing.

In example 3, the subject-matter of example 2 can optionally include that the housing comprises a depression, the trigger button being retracted into the depression when the trigger button is in the second position.

In example 4, the subject-matter of example 2 or example 3 can optionally include that the trigger button extends out of the housing in the first position.

In example 5, the subject-matter of any one of examples 2 to 4 can optionally include that the direction is at least substantially towards the housing.

In example 6, the subject-matter of any one of examples 2 to 5 can optionally include a plurality of control buttons on a front surface of the housing.

In example 7, the subject-matter of example 6 can optionally include that the front surface opposes a back surface of the housing, wherein the trigger button is positioned on the back surface.

In example 8, the subject-matter of example 6 or example 7 can optionally include that the plurality of control buttons comprises at least one of a thumb stick, a direction pad, a bumper or a keypad.

In example 9, the subject-matter of any one of examples 1 to 8 can optionally include that the trigger button is biased towards being undepressed when the trigger button is in the first position.

In example 10, the subject-matter of any one of examples 1 to 9 can optionally include that the trigger button is pivotable to activate a switch.

In example 11, the subject-matter of any one of examples 1 to 10 can optionally include that the trigger button comprises a lever.

In example 12, the subject-matter of example 11 can optionally include that the lever comprises a concave segment shaped to receive a user's finger.

In example 13, the subject-matter of any one of examples 1 to 12 can optionally include that the locking mechanism comprises a pivotable member configured to engage the trigger button.

In example 14, the subject-matter of example 13 can optionally include that the trigger button is pivotable by pivoting the pivotable member, the trigger button being stationary relative to the pivotable member.

In example 15, the subject-matter of example 13 or example 14 can optionally include that the pivotable member comprises a protrusion and the trigger button comprises a hole, the protrusion shaped to fit in the hole.

In example 16, the subject-matter of example 15 can optionally include that the locking mechanism comprises the protrusion and the hole.

In example 17, the subject-matter of example 15 or example 16 can optionally include that at least one of the protrusion or the trigger button is transiently deformed when the protrusion is inserted into the hole.

In example 18, the subject-matter of example 17 can optionally include that the at least one of the protrusion or the trigger button produces an audible sound when released from the transient deformation.

In example 19, the subject-matter of any one of examples 15 to 18 can optionally include that the trigger button comprises a first hole and a second hole, wherein the protrusion fits into the first hole when the trigger button is in the first position, and wherein the protrusion fits into the second hole when the trigger button is in the second position.

In example 20, the subject-matter of example 13 or example 14 can optionally include that the pivotable member comprises a hole and the trigger button comprises a protrusion, the protrusion shaped to fit in the hole.

In example 21, the subject-matter of any one of examples 13 to 20 can optionally include that the trigger button is biased to abut the pivotable member.

In example 22, the subject-matter of example 21 can optionally include that the trigger button is biased to abut the pivotable member by a compression spring.

In example 23, the subject-matter of example 22 can optionally include that rotation of the trigger button compresses the compression spring.

In example 24, the subject-matter of example 23 can optionally include that the trigger button impacts the pivotable member when the compressed compression spring rebounds.

In example 25, the subject-matter of example 24 can optionally include that the impact provides at least one of a tactile feel on the trigger button or an audible sound.

In example 26, the subject-matter of any one of examples 1 to 25 can optionally include that the depression is shaped to accommodate the trigger button.

In example 27, the subject-matter of example 26 can optionally include that the depression comprises a concave space for a user's finger to contact the trigger button when the trigger button is in the second position.

In example 28, the subject-matter of any one of examples 1 to 27 can optionally include that the trigger button rotates through an angle at least substantially equal to 90° between the first position and the second position.

In example 29, the subject-matter of any one of examples 1 to 28 can optionally include the switch.

In example 30, the subject-matter of any one of examples 1 to 29 can optionally include a user interface configured to receive user inputs for programming a function of the trigger button.

While embodiments of the invention have been particularly shown, and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced. It will be appreciated that common numerals, used in the relevant drawings, refer to components that serve a similar or the same purpose.

The invention claimed is:

1. A game controller comprising:
   a trigger button rotatable between a first position and a second position by rotating about a rotation axis, the trigger button being depressible in a direction to activate a switch when the trigger button is in the first position,
   wherein the direction is at least substantially perpendicular to the rotation axis;
   a locking mechanism configured to constrain rotation of the trigger button when the trigger button is in the first position, and further configured to constrain rotation of the trigger button when the trigger button is in the second position, wherein the trigger button comprises a first hole and a second hole, and wherein the locking mechanism comprises a protrusion shaped to fit into the first hole when the trigger button is in the first position, and wherein the protrusion is shaped to fit into the second hole when the trigger button is in the second position;
   a housing;

wherein the housing comprises a depression, the trigger button being retracted into the depression when the trigger button is in the second position.

2. The game controller of claim 1, wherein the trigger button extends out of the housing in the first position.

3. The game controller of claim 1, further comprising:
a plurality of control buttons on a front surface of the housing.

4. The game controller of claim 3, wherein the front surface opposes a back surface of the housing, wherein the trigger button is positioned on the back surface.

5. The game controller of claim 1, wherein the trigger button is biased towards being undepressed when the trigger button is in the first position.

6. The game controller of claim 1, wherein the trigger button is pivotable to activate a switch.

7. The game controller of claim 1, wherein the trigger button comprises a lever.

8. The game controller of claim 7, wherein the lever comprises a concave segment shaped to receive a user's finger.

9. The game controller of claim 1, wherein the locking mechanism comprises a pivotable member configured to engage the trigger button.

10. The game controller of claim 9, wherein the trigger button is biased to abut the pivotable member.

11. The game controller of claim 10, wherein the trigger button is biased to abut the pivotable member by a compression spring.

12. The game controller of claim 11, wherein rotation of the trigger button compresses the compression spring.

13. The game controller of claim 1, wherein the depression is shaped to accommodate the trigger button.

14. The game controller of claim 13, wherein the depression comprises a concave space for a user's finger to contact the trigger button when the trigger button is in the second position.

15. The game controller of claim 1, wherein the trigger button rotates through an angle at least substantially equal to 90° between the first position and the second position.

16. The game controller of claim 1, further comprising:
the switch.

17. The game controller of claim 1, further comprising a user interface configured to receive user inputs for programming a function of the trigger button.

* * * * *